United States Patent
Biegun

(10) Patent No.: US 9,505,377 B2
(45) Date of Patent: *Nov. 29, 2016

(54) PASSENGER RESTRAINT FOR AMUSEMENT PARK RIDE

(71) Applicant: Jeffery L. Biegun, Jupiter, FL (US)

(72) Inventor: Jeffery L. Biegun, Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,580

(22) Filed: Apr. 3, 2015

(65) Prior Publication Data

US 2015/0210238 A1 Jul. 30, 2015

Related U.S. Application Data

(63) Continuation-in-part of application No. 14/083,276, filed on Nov. 18, 2013, now Pat. No. 8,998,340.

(51) Int. Cl.
| | |
|---|---|
| *B60R 21/00* | (2006.01) |
| *B60R 22/32* | (2006.01) |
| *A63G 7/00* | (2006.01) |
| *B60R 22/18* | (2006.01) |
| *A44B 11/25* | (2006.01) |
| *B60R 22/48* | (2006.01) |

(52) U.S. Cl.
CPC ............. *B60R 22/321* (2013.01); *A63G 7/00* (2013.01); *A44B 11/2573* (2013.01); *B60R 2021/0097* (2013.01); *B60R 2022/1806* (2013.01); *B60R 2022/4816* (2013.01)

(58) Field of Classification Search
CPC .......................... A63G 7/00; B60R 2022/1806
USPC ........................................ 297/464, 468, 487
See application file for complete search history.

(56) References Cited

U.S. PATENT DOCUMENTS

| | | | | | |
|---|---|---|---|---|---|
| 3,955,056 | A | * | 5/1976 | Lindblad | B60R 22/48 297/468 X |
| 4,345,780 | A | * | 8/1982 | Moriya | B60R 22/04 280/802 |
| 4,555,831 | A | * | 12/1985 | Otzen | B60R 22/321 297/468 X |
| 5,044,664 | A | * | 9/1991 | Mogi | B60R 13/025 297/468 X |
| 5,129,478 | A | * | 7/1992 | Suenaga | B60R 21/02 297/487 X |
| 5,286,091 | A | * | 2/1994 | Busch | B60R 21/02 297/464 |
| 7,677,671 | B2 | * | 3/2010 | Steininger | A63G 7/00 297/487 |
| 8,449,038 | B2 | * | 5/2013 | Flanigan | B60R 22/00 297/468 X |
| 8,590,935 | B1 | * | 11/2013 | Leedy | B60R 22/321 297/468 X |
| 8,998,340 | B1 | * | 4/2015 | Biegun | A63G 7/00 297/464 |
| 2012/0068521 | A1 | * | 3/2012 | Roodenburg | B60R 21/026 297/487 |

* cited by examiner

*Primary Examiner* — Rodney B White

(74) *Attorney, Agent, or Firm* — Simpson & Simpson, PLLC

(57) ABSTRACT

A passenger restraint including a buckle, a locking arm, a power supply, a bracket, a mount, and a rod. The buckle has a top surface, front surface and a button integral with the front surface, where the button is capable of being depressed. The bracket is secured to the locking arm. The power supply is secured to the mount and the bracket is secured to and pivotable about the mount. The rod is affixed to the bracket and the rod is secured to the power supply. The locking arm is in an open position until an electrical signal from the power supply is applied, such that when an electrical signal is applied, the rod is operatively arranged to extend outwardly from the power supply, such that when the rod extends outwardly, the bracket pivots forcing the locking arm downwardly into an opening of the buckle and into a closed position.

14 Claims, 10 Drawing Sheets

PASSENGER RESTRAINT FOR AMUSEMENT PARK RIDE

CROSS-REFERENCE TO RELATED APPLICATIONS

This application is a Continuation-in-Part patent application under 35 U.S.C. §120 of U.S. patent application Ser. No. 14/083,276 filed Nov. 18, 2013, now U.S. Pat. No. 8,998,340, which application is incorporated herein by reference.

FIELD OF THE INVENTION

The invention broadly relates to a passenger restraint for an amusement park ride, and in particular, to a passenger restraint having a buckle and a locking arm, such that when an electrical signal is applied, the locking arm shifts from an open position to a closed position.

BACKGROUND OF THE INVENTION

Passenger restraints for amusement park rides are well known. Amusement park rides can include a variety of different ride types, such as thrill rides, roller coasters, train rides, water rides, Ferris wheels, transport rides, and the like. Depending on the ride, the majority of amusement park rides have some form of passenger restraint to prevent riders from falling from the ride or exiting the ride at an inappropriate time. Amusement park rides are subject to state and local governmental codes, requirements, and safety inspections, and must pass rigorous inspections by insurance companies.

Despite safety measures, accidents relating to amusement park rides can, and do, occur. Ride accidents can be caused by riders themselves, ride operators not following safety directions properly, or by mechanical failures related to the ride or passenger restraints. Additionally, a major cause of deaths and injuries on amusement park rides is preventable error. This would include such things as the lack of routine maintenance and the disregard of safety rules by both operators and riders. In particular, on rides having lap restraints, riders have been known to unbuckle the restraint while the ride is in motion, posing a serious risk of injury and potentially death, not only to that particular rider but to other riders as well. Thus, there is a long felt need for a passenger restraint for an amusement park ride that complies with current safety standards and prevents riders from being able to undo the restraint and exit the ride while the ride is in motion.

BRIEF SUMMARY OF THE INVENTION

The present invention broadly includes a buckle, a locking arm, a power supply, a bracket, a mount, and a rod. The buckle has a top surface, front surface and a button integral with the front surface, where the button is capable of being depressed. The locking arm has first and second extensions, each extension extending outwardly therefrom, and first and second prongs, each prong extending downwardly from the first and second extensions, respectively. The top surface of the buckle includes an opening operatively arranged to receive the first and second prongs. The bracket is secured to the locking arm. The mount has first and second mount sides and first and second mount side fastening means. The power supply is secured to the mount and the bracket is secured to and pivotable about the mount via first and second mount side fastening means. The bracket further includes first and second rod fastening means and the rod is secured to the bracket via first and second rod fastening means. Additionally, the rod is secured to the power supply and the locking arm is in an open position until an electrical signal from the power supply is applied. When an electrical signal is applied, the rod is operatively arranged to extend outwardly from the power supply, such that when the rod extends outwardly, the bracket pivots about the first and second mount side fastening means, forcing the locking arm downwardly into the opening of the buckle, and thus, into a closed position.

In one embodiment, the power supply is a solenoid, and preferably, the solenoid is 12 volts. However, it should be appreciated that the power supply can be any suitable type of power supply of any voltage known in the art.

In another embodiment, the passenger restraint further includes a belt and a tongue, where the tongue is secured to the belt. The buckle further includes a spring secured to the button, where the button has a first position and a second position, such that in a resting state the button is in a first position. When the button is depressed, it forms a second position and when the button is released the spring returns the button to the first position. The front surface of the buckle further includes an aperture and the aperture is capable of receiving the tongue. When the locking arm is in a closed position, the button is incapable of being depressed and the tongue is incapable of being removed from the aperture.

In yet another embodiment, the passenger restraint further includes a signaling source and the buckle further includes at least one wire. When the tongue is inserted into the aperture, the tongue makes contact with the at least one wire, where the at least one wire is connected to the signaling source and the signaling source is operatively arranged to change state when the tongue is inserted into the aperture. The signaling source has a first indicator when the tongue is inserted and a second indicator when the tongue is removed, and preferably, the first indicator is a green light and the second indicator is a red light.

In an alternate embodiment, the present invention broadly includes a buckle, a locking arm, a power supply, a bracket, a mount, and a rod. The buckle has a top surface, front surface and a button integral with the front surface and the button is capable of being depressed. The top surface of the buckle includes an opening operatively arranged to receive the locking arm and the bracket is secured to the locking arm. The power supply is secured to the mount and the bracket is secured to and pivotable about the mount. The rod is affixed to the bracket and the rod is secured to the power supply. The locking arm is in an open position until an electrical signal from the power supply is applied, such that when an electrical signal is applied, the rod is operatively arranged to extend outwardly from the power supply, such that when the rod extends outwardly, the bracket pivots, forcing the locking arm downwardly into the opening of the buckle and into a closed position.

In one embodiment of the alternate embodiment, the locking arm has first and second extensions, each extension extending outwardly therefrom, and first and second prongs, each prong extending downwardly from the first and second extensions, respectively. The mount has first and second mount sides and at least one fastening means, the power supply is secured to the mount, and the bracket is secured to and pivotable about the mount via the at least one fastening means. The rod is affixed to the bracket via a plate and the plate is disposed substantially perpendicular to the rod.

In another embodiment of the alternate embodiment, the power supply is a solenoid, and preferably, the solenoid is 12 volts. However, it should be appreciated that the power supply can be any suitable type of power supply of any voltage known in the art.

In yet another embodiment of the alternate embodiment, the passenger restraint further includes a belt and a tongue, where the tongue is secured to the belt. The buckle further includes a spring secured to the button, where the button has a first position and a second position, such that in a resting state the button is in a first position. When the button is depressed, it forms a second position and when the button is released the spring returns the button to the first position. The front surface of the buckle further includes an aperture and the aperture is capable of receiving the tongue. When the locking arm is in a closed position, the button is incapable of being depressed and the tongue is incapable of being removed from the aperture.

In yet another embodiment of the alternate embodiment, the passenger restraint further includes a signaling source and the buckle further includes at least one wire. When the tongue is inserted into the aperture, the tongue makes contact with the at least one wire, where the at least one wire is connected to the signaling source and the signaling source is operatively arranged to change state when the tongue is inserted into the aperture. The signaling source has a first indicator when the tongue is inserted and a second indicator when the tongue is removed, and preferably, the first indicator is a green light and the second indicator is a red light.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. It also should be appreciated that figure proportions and angles are not always to scale in order to clearly portray the attributes of the present invention.

While the present invention is described with respect to what is presently considered to be the preferred aspects, it is to be understood that the invention as claimed is not limited to the disclosed aspects. The present invention is intended to cover various modifications and equivalent arrangements included within the spirit and scope of the appended claims.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
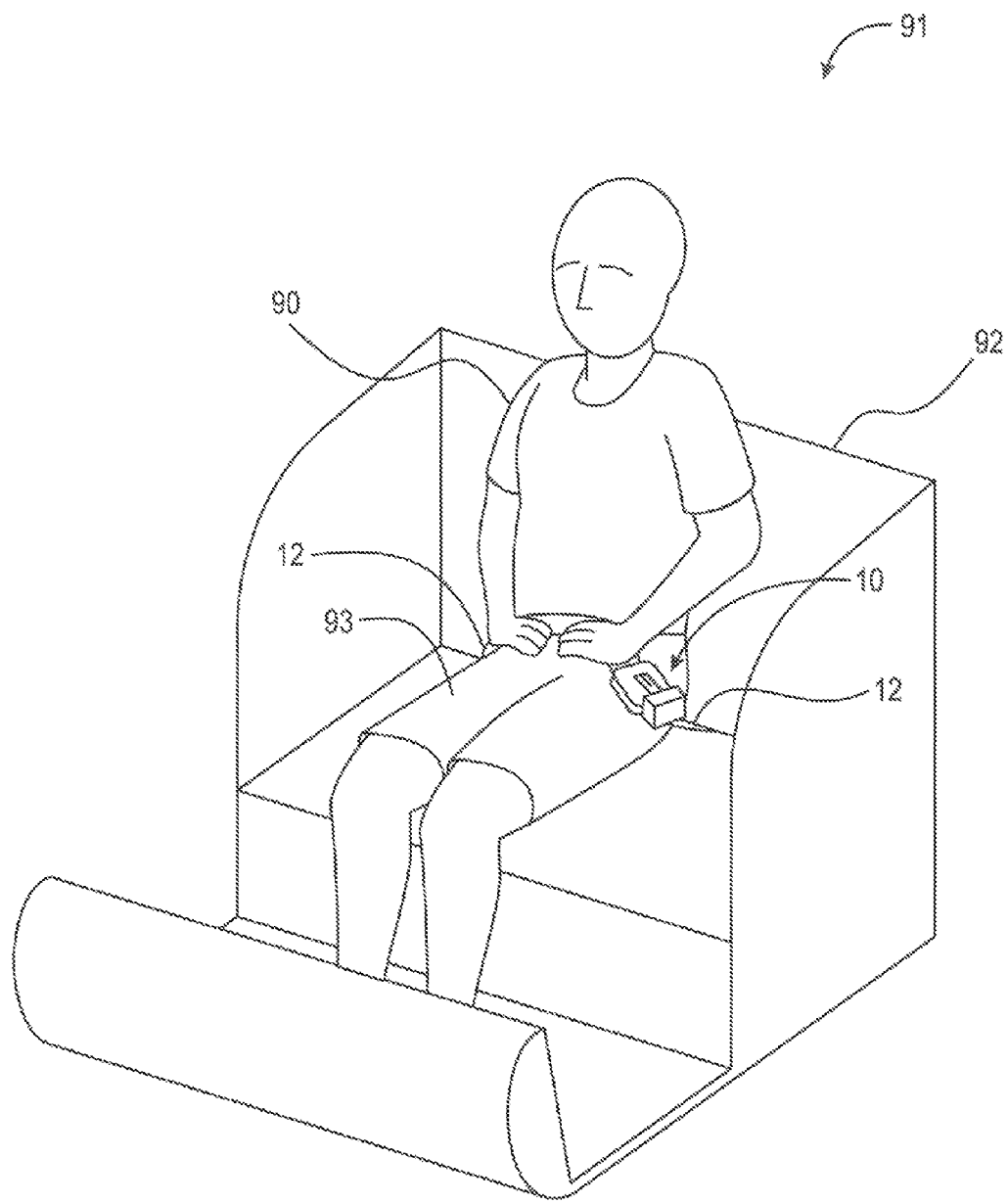
FIG. 1 is a perspective view of a passenger restraint for an amusement park ride, shown with a rider seated in the amusement park ride and secured via the passenger restraint.

Adverting now to the figures, FIG. 1 is a perspective view of passenger restraint 10 of the present invention for amusement park ride 91, shown with rider 90 seated on bench 92 of amusement park ride 91 and secured via passenger restraint 10. Passenger restraint 10 is secured across lap 93 of rider 90.

Figure 2:
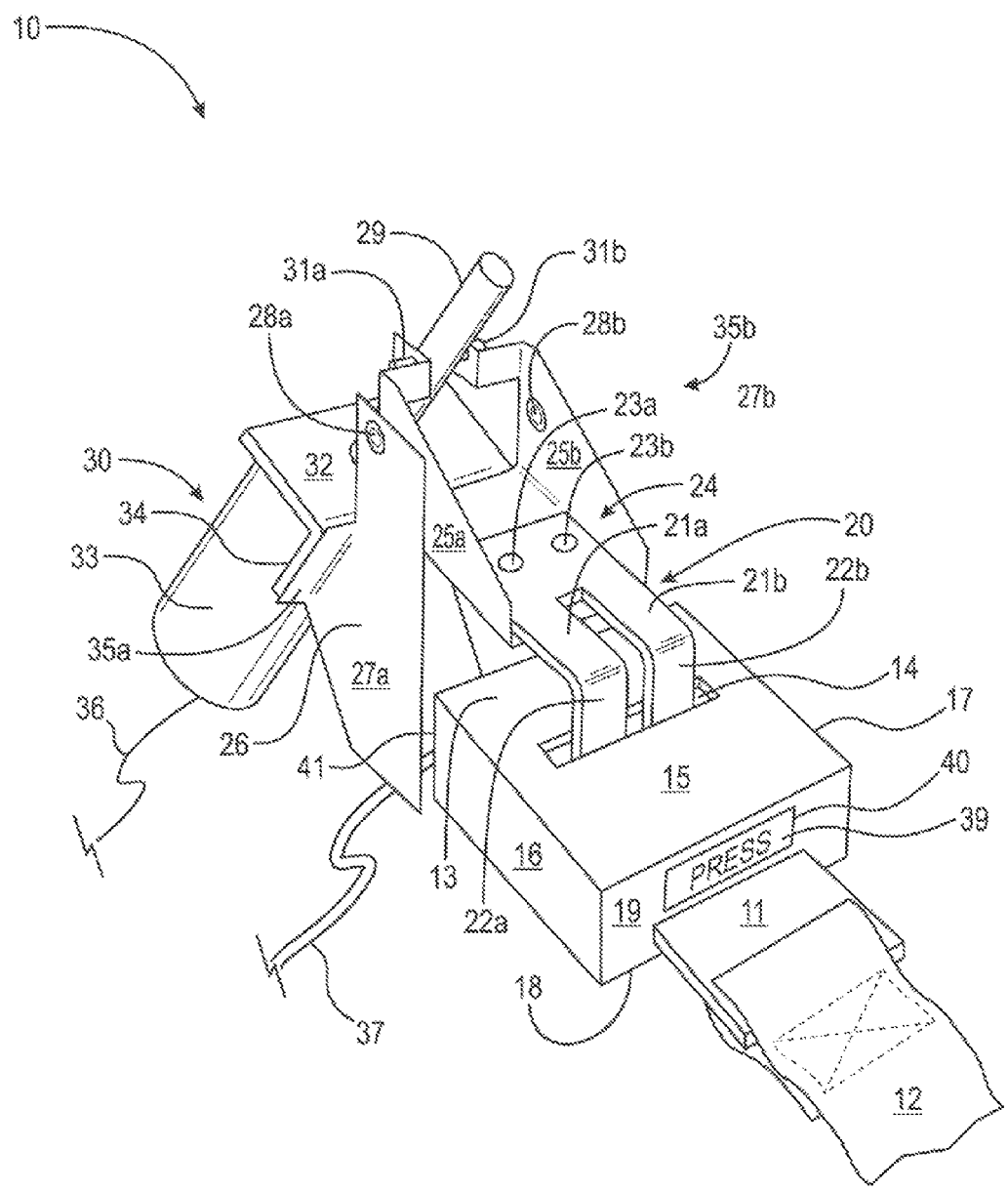
FIG. 2 is a front perspective view of the passenger restraint of FIG. 1.

FIG. 2 is a front perspective view of passenger restraint 10.

Figure 3A:
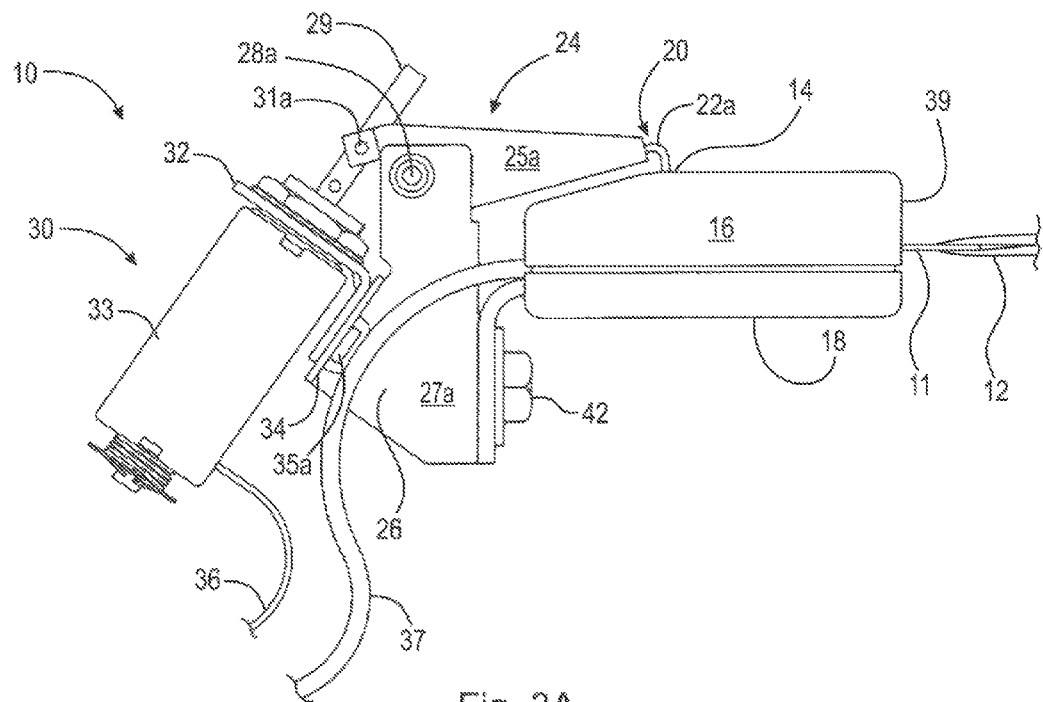
FIG. 3a is a left side elevational view of the passenger restraint of FIG. 2, shown in a closed position.
Figure 3B:
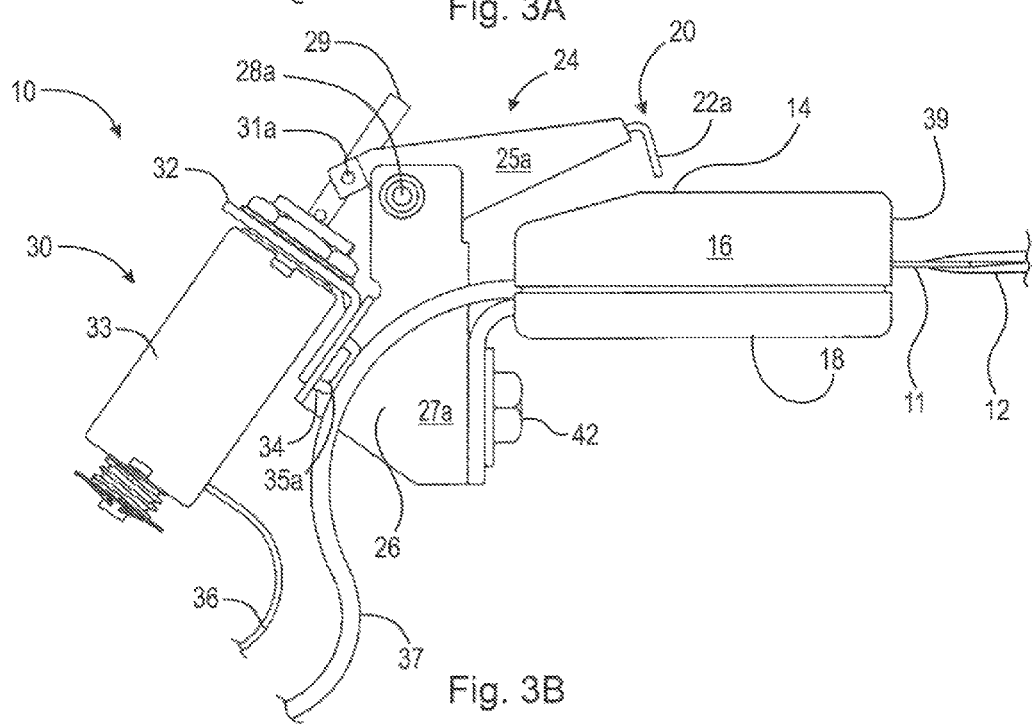
FIG. 3b is a left side elevational view of the passenger restraint of FIG. 2, shown in an open position.

FIG. 3a is a left side elevational view of passenger restraint 10, shown in a closed position. Similarly, FIG. 3b is a left side elevational view of passenger restraint 10, but shown in an open position.

Figure 4A:
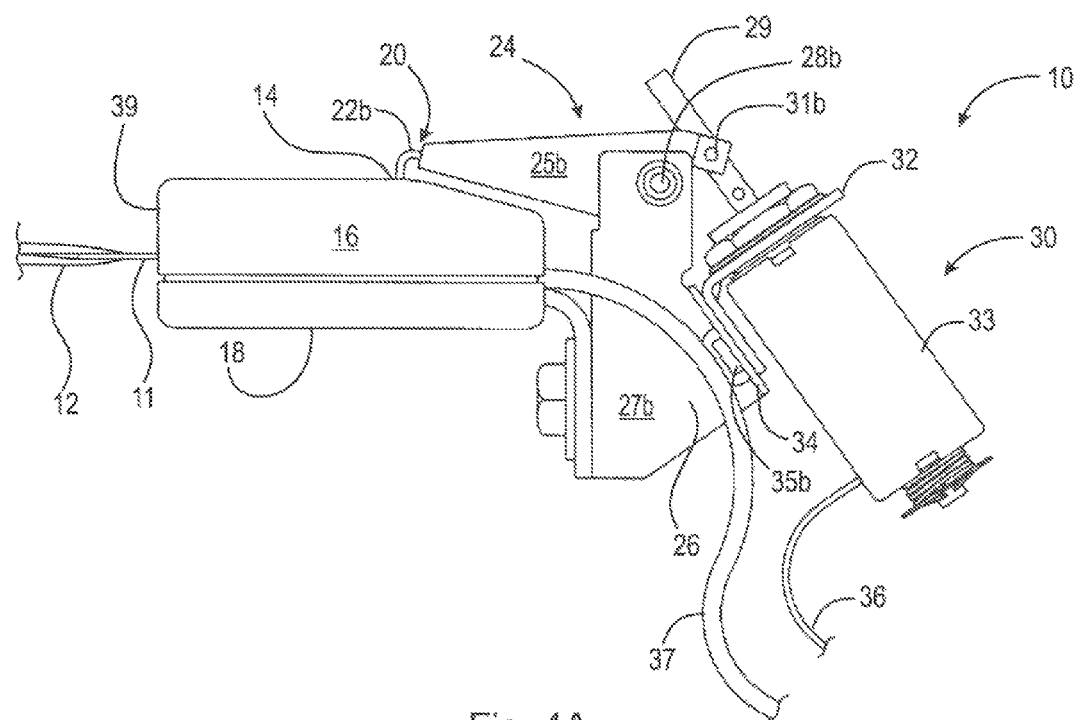
FIG. 4a is a right side elevational view of the passenger restraint of FIG. 2, shown in a closed position.
Figure 4B:
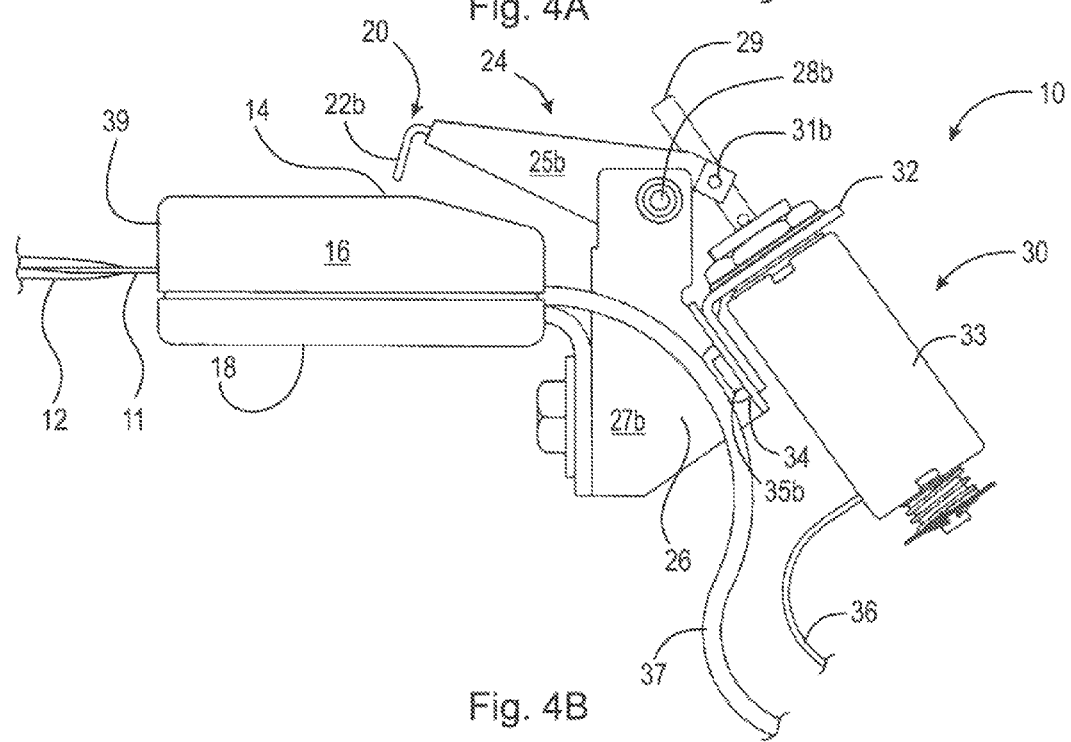
FIG. 4b a right side elevational view of the passenger restraint of FIG. 2, shown in an open position.

FIG. 4a is a right side elevational view of passenger restraint 10, shown in a closed position. Similarly, FIG. 4b a right side elevational view of passenger restraint 10, but shown in an open position.

Figure 5:
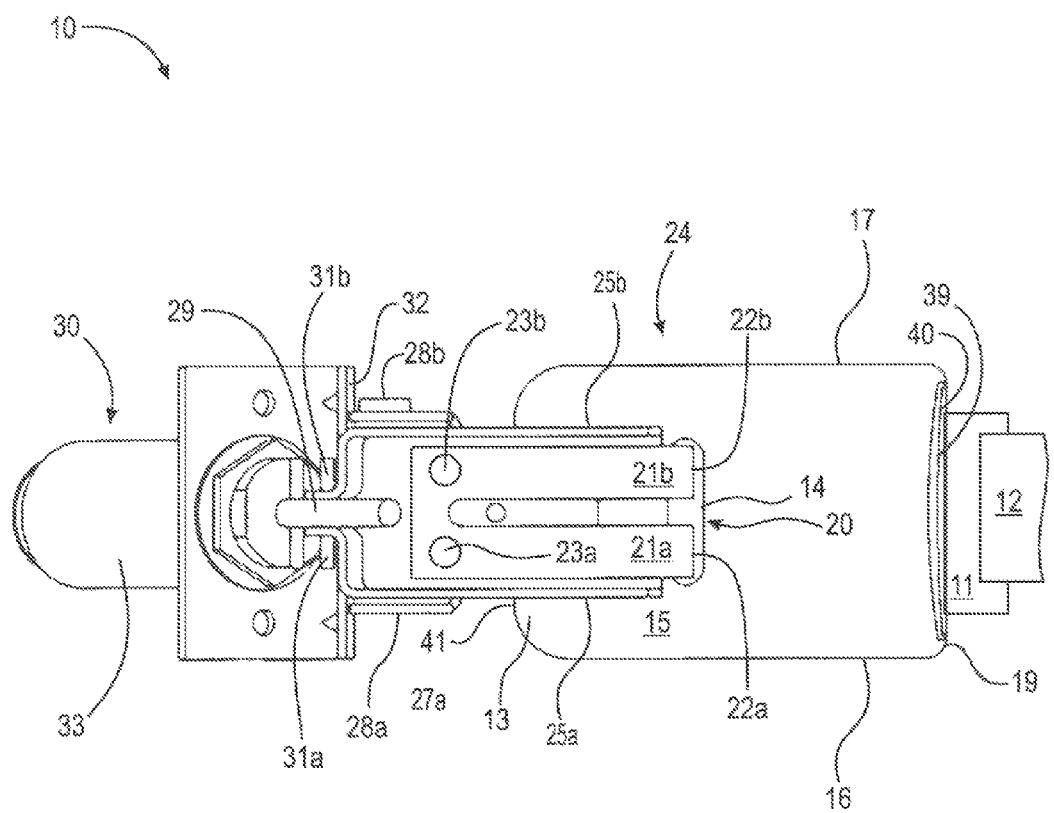
FIG. 5 is a top plan view of the passenger restraint of FIG. 2.

FIG. 5 is a top plan view of passenger restraint 10.

Figure 6:
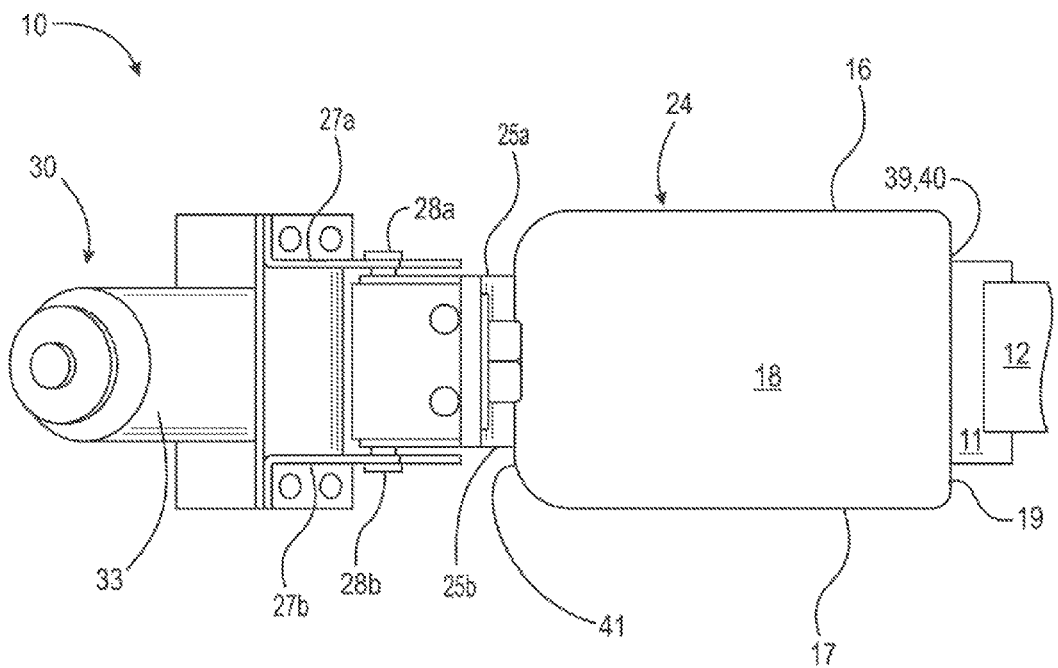
FIG. 6 is a bottom plan view of the passenger restraint of FIG. 2.

FIG. 6 is a bottom plan view of passenger restraint 10.

Figure 7:
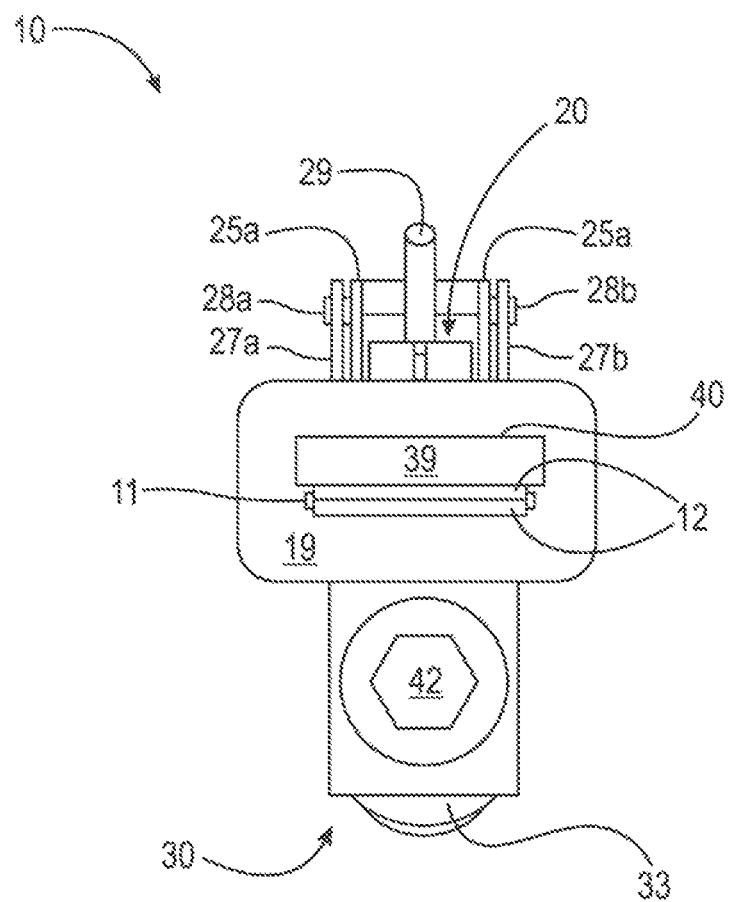
FIG. 7 is a front elevational view of the passenger restraint of FIG. 2.

FIG. 7 is a front elevational view of passenger restraint 10.

The present invention passenger restraint 10 broadly includes buckle 13, locking arm 20, power supply 33, bracket 24, mount 26, and rod 29. Buckle 13 has top surface 15, front surface 19, left side surface 16, right side surface 17, bottom surface 18, and rear surface 41. Buckle 13 further includes button 39 integral with front surface 19, such that button 19 is capable of being depressed. Locking arm 20 has first and second extensions 21a, 21b, each extension 21a, 21b extending outwardly from locking arm 20. Locking arm 20 also has first and second prongs 22a, 22b, each prong 22a, 22b extending downwardly from first and second extensions 21a, 21b, respectively. Top surface 15 of buckle 13 includes opening 14 operatively arranged to receive first and second prongs 22a, 22b. Bracket 24 is secured to locking arm 20. Mount 26 has first and second mount sides 27a, 27b and first and second mount side fastening means 28a, 28b. Power supply 33, which includes at least one wire 36, is secured to mount 26 and bracket 24 is secured to and pivotable about mount 26 via first and second mount side fastening means 27a, 27b. Bracket 24 further includes first and second rod fastening means 31a, 31b and rod 29 is secured to bracket 24 via first and second rod fastening means 31a, 31b. Additionally, rod 29 is secured to and mounted on power supply 33 via support 32, which includes back plate 34. Mount 26 is secured to power supply 33 via back plate 34 by first and second back plate fastening means 35a, 35b. Rod 29, power supply 33, and support 32 form power supply assembly 30. When in a resting state, locking arm 20 is in an open position until an electrical signal from power supply 33 is applied. When an electrical signal is applied, rod 29 is operatively arranged to extend outwardly from power supply 33, such that when rod 29 extends outwardly, bracket 24 pivots about first and second mount side fastening means 28a, 28b, forcing locking arm 20 downwardly into opening 14 of buckle 13, and thus, into a closed position. Locking arm 20 is secured to bracket 24 via first and second locking arm fastening means 23a, 23b. First mount side 27a is secured to first bracket side 25a via first mount side fastening means 28a. Similarly, second mount side 27b is secured to second bracket side 25b via second mount side fastening means 28b. Mounting plate 43 secures buckle 13 to mount 26 via fastening means 42.

In one embodiment, the power supply 33 is a solenoid, and preferably, the solenoid is 12 volts. However, it should be appreciated that the power supply can be any suitable type of power supply of any voltage known in the art.

In another embodiment, passenger restraint 10 further includes belt 12 and tongue 11, where tongue 11 is secured to belt 12. Buckle 13 further includes a spring (not shown in the figures) within buckle 13 secured to button 39. Button 39 has a first position and a second position, such that in a resting state the button is in a first position. When the button is depressed, it forms a second position and when the button is released the spring returns the button to the first position. Front surface 19 of buckle 13 further includes aperture 40 and aperture 40 is capable of receiving tongue 11. When locking arm 20 is in a closed position, button 39 is incapable of being depressed and tongue 11 is incapable of being removed from aperture 40.

In yet another embodiment, passenger restraint 10 further includes a signaling source (not shown in the figures) and buckle 13 further includes at least one wire 37. When tongue 11 is inserted into aperture 40, tongue 11 makes contact with at least one wire 37, where the at least one wire 37 is connected to the signaling source and the signaling source is operatively arranged to change state when tongue 11 is inserted into aperture 40. The signaling source has a first indicator (not shown in the figures) when the tongue is inserted and a second indicator (not shown in the figures) when the tongue is removed. Preferably, the first indicator is a green light and the second indicator is a red light.

It should be appreciated that, any of the fastening or attachment means of the passenger restraint can be any suitable fastening means known in the art, such as but not limited to, screws, bolts, welds, etc.

Figure 8:
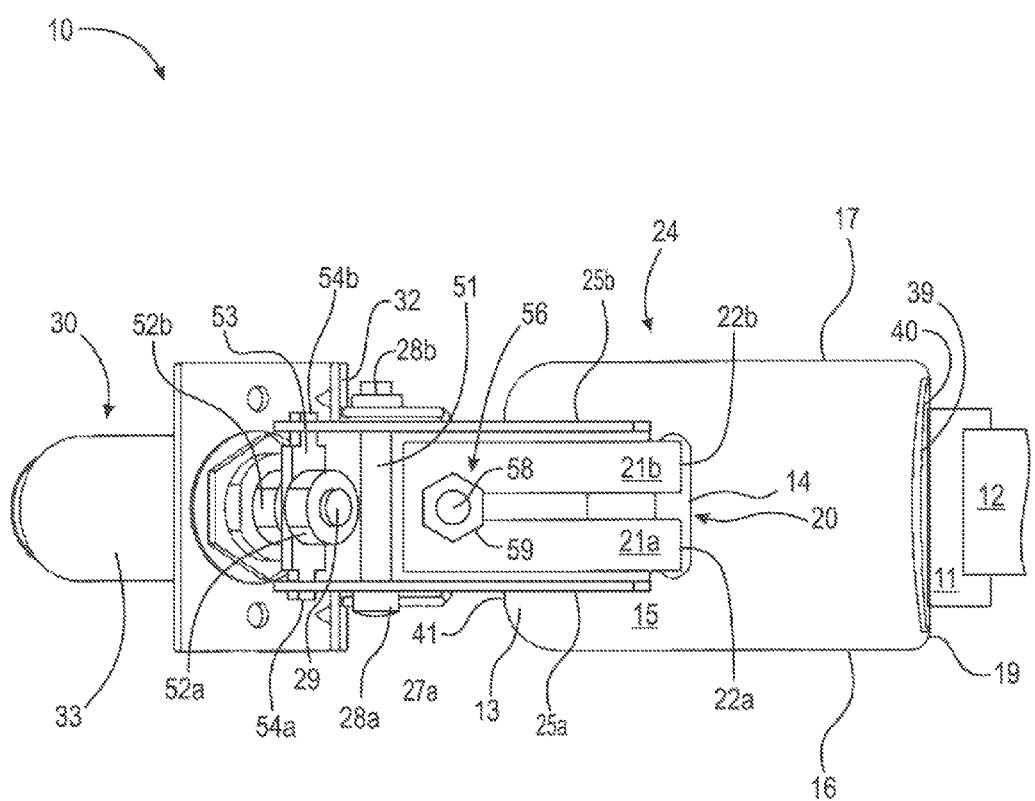
FIG. 8 is a top plan view of an alternate embodiment of the passenger restraint.

FIG. 8 is a top plan view of an alternate embodiment of passenger restraint 10.

Figure 9A:
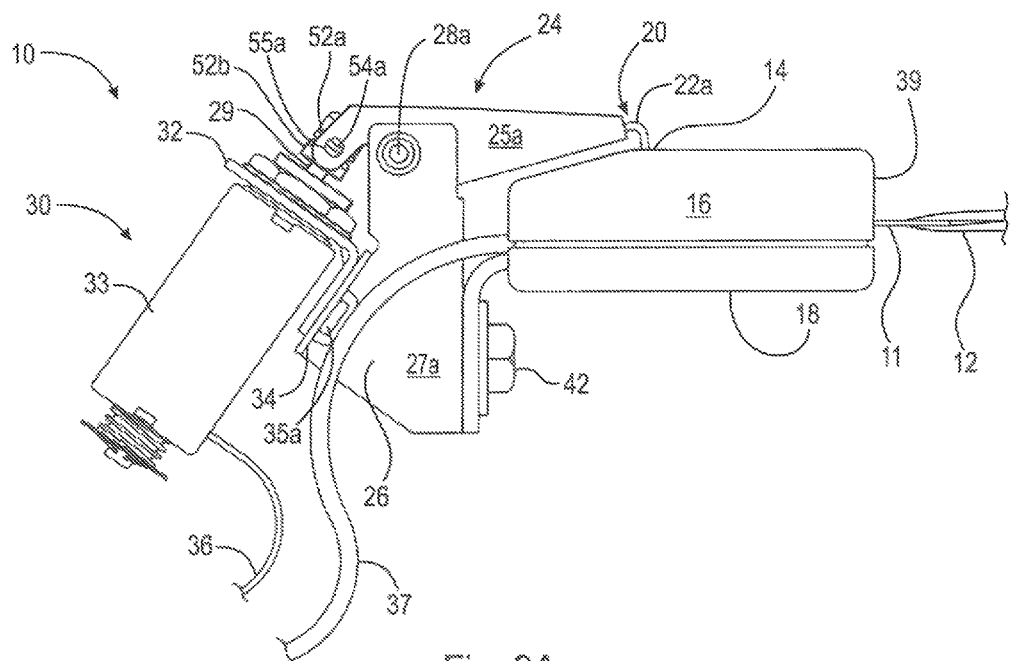
FIG. 9a is a left side elevational view of the alternate embodiment of the passenger restraint of FIG. 8, shown in a closed position.
Figure 9B:
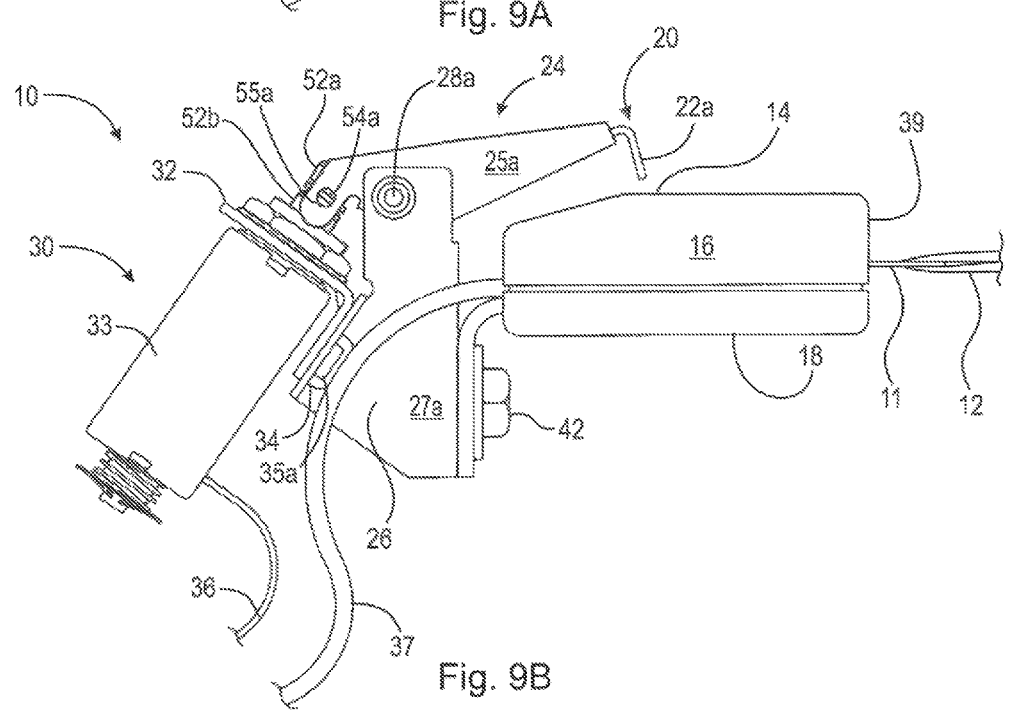
FIG. 9b is a left side elevational view of the alternate embodiment of the passenger restraint of FIG. 8, but shown in an open position.

FIG. 9a is a left side elevational view of the alternate embodiment of passenger restraint 10, shown in a closed position. Similarly, FIG. 9b is a left side elevational view of the alternate embodiment of passenger restraint 10, but shown in an open position.

Figure 10A:
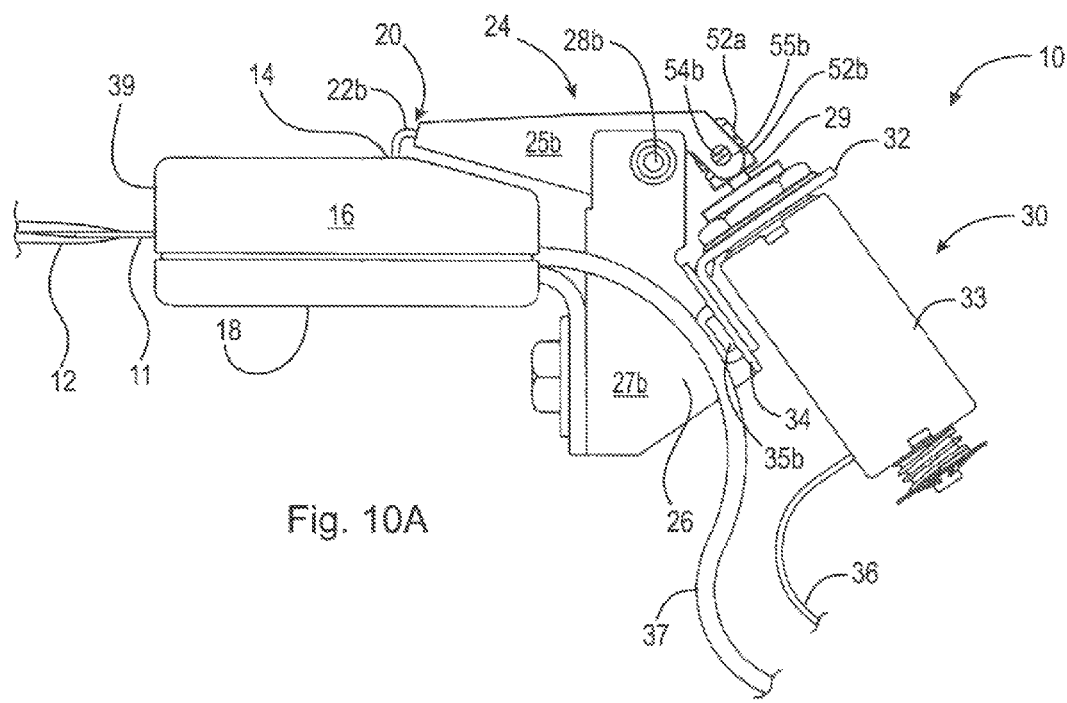
FIG. 10a is a right side elevational view of the alternate embodiment of the passenger restraint of FIG. 8, shown in a closed position.
Figure 10B:
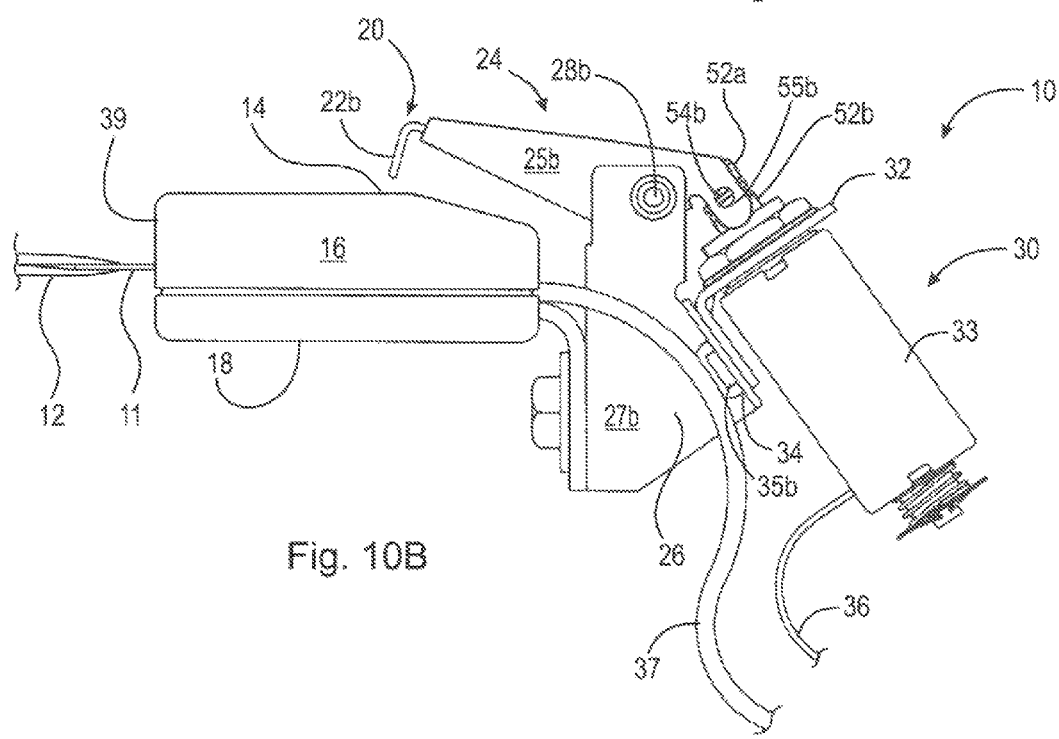
FIG. 10b a right side elevational view of the alternate embodiment of the passenger restraint of FIG. 8, but shown in an open position.

FIG. 10a is a right side elevational view of the alternate embodiment of passenger restraint 10, shown in a closed position. Similarly, FIG. 10b a right side elevational view of the alternate embodiment of passenger restraint 10, but shown in an open position.

FIGS. 8 through 10b depict an alternate embodiment of passenger restraint 10. Similar to the first embodiment, passenger restraint 10 broadly includes buckle 13, locking arm 20, power supply 33, bracket 24, mount 26, and rod 29. Buckle 13 has top surface 15, front surface 19, left side surface 16, right side surface 17, bottom surface 18, and rear surface 41. Buckle 13 further includes button 39 integral with front surface 19, such that button 19 is capable of being depressed. Locking arm 20 has first and second extensions 21a, 21b, each extension 21a, 21b extending outwardly from locking arm 20. Locking arm 20 also has first and second prongs 22a, 22b, each prong 22a, 22b extending downwardly from first and second extensions 21a, 21b, respectively. Top surface 15 of buckle 13 includes opening 14 operatively arranged to receive first and second prongs 22a, 22b. Bracket 24 is secured to locking arm 20. Power supply 33, which includes at least one wire 36, is secured to mount 26.

In contrast to the first embodiment, mount 26 has first and second mount sides 27a, 27b and at least one fastening means, bolt 51, which is disposed substantially perpendicular to first and second mount sides 27a, 27b, and secures bracket 24 to mount 26, allowing bracket 24 to pivot about mount 26. Bolt 51 includes first and second mount side fastening means 28a, 28b, which secure bolt 51 to first and second mount sides 27a, 27b, respectively.

Additionally, in contrast to the first embodiment, rod 29 is secured to bracket 24 via plate 53 and plate 53 is disposed substantially perpendicular to rod 29. Rod 29 is disposed through first and second nuts 52a, 52b. In particular, first nut 52a is secured to rod 29 and adjacent to the face of plate 51 distal from power supply 33, whereas second nut 52b is secured to rod 29 and adjacent to the face of plate 51 proximate to power supply 33. Furthermore, plate 51 includes first and second tabs 54a, 54b disposed on opposite ends of plate 51. Bracket 24 includes first and second apertures 55a, 55b. In particular, first bracket side 25a includes first aperture 55a and second bracket side 25b includes second aperture 55b. When plate 51 is secured to rod 29, first tab 54a is disposed within first aperture 55a, and second tab 54b is disposed within second aperture 55b.

Similar to the first embodiment, rod 29 is secured to and mounted on power supply 33 via support 32, which includes back plate 34. Mount 26 is secured to power supply 33 via back plate 34 by first and second back plate fastening means 35a, 35b. Rod 29, power supply 33, and support 32 form power supply assembly 30. When in a resting state, locking arm 20 is in an open position until an electrical signal from power supply 33 is applied. When an electrical signal is applied, rod 29 is operatively arranged to extend outwardly from power supply 33, such that when rod 29 extends outwardly, bracket 24 pivots, forcing locking arm 20 downwardly into opening 14 of buckle 13, and thus, into a closed position. However, in contrast, locking arm 20 is secured to bracket 24 via locking arm fastening means 56, which includes screw 58 and nut 59. Fastening means 56 is disposed in the space between first and second extensions 21a, 21b, such that screw 58 is disposed substantially perpendicular to first and second extensions 21a, 21b and nut 59 is secured to and end of screw 58 and is adjacent to the top surface of locking arm 20. Mounting plate 43 secures buckle 13 to mount 26 via fastening means 42.

It should be appreciated that, any of the fastening or attachment means of the passenger restraint can be any suitable fastening means known in the art, such as but not limited to, screws, bolts, welds, etc.

The present invention also includes a method, the method having the following steps: inserting a tongue into an aperture of a buckle; applying an electrical signal to the power supply, which extends the rod; and pivoting the locking arm from an open position to a closed position. Additionally, after the tongue is inserted into the aperture of the buckle, signaling that the tongue is inserted into the buckle via a signaling source.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A passenger restraint, comprising:
   a buckle, the buckle having a top surface, front surface and a button integral with the front surface, wherein the button is capable of being depressed;
   a locking arm, wherein the top surface of the buckle includes an opening operatively arranged to receive the locking arm;
   a power supply;
   a bracket, wherein the bracket is secured to the locking arm;
   a mount, wherein the power supply is secured to the mount and the bracket is secured to and pivotable about the mount;
   a rod, wherein the rod is affixed to the bracket and the rod is secured to the power supply, and the locking arm is in an open position until an electrical signal from the power supply is applied, such that when an electrical signal is applied, the rod is operatively arranged to extend outwardly from the power supply, such that when the rod extends outwardly, the bracket pivots forcing the locking arm downwardly into the opening of the buckle and into a closed position.

2. The passenger restraint of claim 1, wherein the locking arm has first and second extensions, each extension extending outwardly therefrom, and first and second prongs, each prong extending downwardly from the first and second extensions, respectively.

3. The passenger restraint of claim 1, wherein the mount has first and second mount sides and at least one fastening means, wherein the power supply is secured to the mount and the bracket is secured to and pivotable about the mount via the at least one fastening means.

4. The passenger restraint of claim 1, wherein the rod is affixed to the bracket via a plate and the plate is disposed substantially perpendicular to the rod.

5. The passenger restraint of claim 1, wherein the power supply is a solenoid.

6. The passenger restraint of claim 5, wherein the solenoid is 12 volts.

7. The passenger restraint of claim 1, wherein the buckle further comprises a spring secured to the button and the button has a first position and a second position, such that in a resting state the button is in a first position, and when the button is depressed, it forms a second position, wherein when the button is released the spring returns the button to the first position.

8. The passenger restraint of claim 7, wherein when the locking arm is in a closed position, the button is incapable of being depressed.

9. The passenger restraint of claim 1, further comprising a belt and a tongue, wherein the tongue is secured to the belt.

10. The passenger restraint of claim 9, wherein the buckle further comprises a spring secured to the button and the button has a first position and a second position, such that in a resting state the button is in a first position and when the button is depressed, it forms a second position, wherein when the button is released the spring returns the button to the first position.

11. The passenger restraint of claim 10, wherein the front surface of the buckle further comprises an aperture and the aperture is capable of receiving the tongue, such that when the locking arm is in a closed position, the button is incapable of being depressed and the tongue is incapable of being removed from the aperture.

12. The passenger restraint of claim 11, further comprising a signaling source and the buckle further comprises at least one wire, such that when the tongue is inserted into the aperture, the tongue makes contact with the at least one wire, wherein the at least one wire is connected to the signaling source and the signaling source is operatively arranged to change state when the tongue is inserted into the aperture.

13. The passenger restraint of claim 12, wherein the signaling source has a first indicator when the tongue is inserted and a second indicator when the tongue is removed.

14. The passenger restraint of claim 13, wherein the first indicator is a green light and the second indicator is a red light.

* * * * *